United States Patent [19]
Aikawa

[11] Patent Number: 6,145,486
[45] Date of Patent: Nov. 14, 2000

[54] APPARATUS FOR CONTROLLING FUEL INJECTION QUANTITY AT THE TIME OF STARTING DIESEL ENGINE AND METHOD

[75] Inventor: Takanobu Aikawa, Kanagawa-ken, Japan

[73] Assignee: Nissan Motor Co., Ltd., Yokohama, Japan

[21] Appl. No.: 09/348,638

[22] Filed: Jul. 6, 1999

[30] Foreign Application Priority Data

Jul. 6, 1998 [JP] Japan .................................. 10-190447

[51] Int. Cl.[7] ........................... F02D 29/00; F02D 41/04; F02D 41/06; F02D 41/40
[52] U.S. Cl. ...................................... 123/179.17; 123/491
[58] Field of Search .............................. 123/179.17, 305, 123/491

[56] References Cited

U.S. PATENT DOCUMENTS

| | | | |
|---|---|---|---|
| 4,388,845 | 6/1983 | Kishi et al. | 477/100 |
| 4,433,650 | 2/1984 | Amano et al. | 123/179.17 |
| 5,809,973 | 9/1998 | Iida et al. | 123/491 |
| 5,819,705 | 10/1998 | Scherer et al. | 123/357 |

FOREIGN PATENT DOCUMENTS 62-9054  1/1987  Japan .

Primary Examiner—Henry C. Yuen
Assistant Examiner—Arnold Castro
Attorney, Agent, or Firm—Foley & Lardner

[57] ABSTRACT

An apparatus controlling a fuel injection quantity at the time of starting a Diesel engine and a method are disclosed. The apparatus and method detect a water temperature at the time of starting the Diesel engine, detect an engine speed at the time of starting the Diesel engine, set a starting fuel injection quantity based on the water temperature at the time of starting the Diesel engine and the engine speed at the time of starting the Diesel engine, detect a line pressure of an automatic transmission mounted to the Diesel engine, and correct the starting fuel injection quantity based on the line pressure of the automatic transmission.

9 Claims, 7 Drawing Sheets

1 …

APPARATUS FOR CONTROLLING FUEL INJECTION QUANTITY AT THE TIME OF STARTING DIESEL ENGINE AND METHOD

BACKGROUND OF THE INVENTION

The present invention relates to an apparatus for controlling a fuel injection quantity at the time of starting a Diesel engine and a method for controlling a fuel injection quantity at the time of starting a Diesel engine.

Conventionally, a fuel injection quantity at the time of starting a Diesel engine is set by referring to a water temperature and an engine speed at the time of starting, and a previously-prepared fuel injection quantity map.

In addition, Japanese Patent Application Laid-Open No. 62-9054 discloses that a line pressure of an automatic transmission is controlled according to a parameter relating to an engine power.

SUMMARY OF THE INVENTION

According to the inventor's analysis, when a Diesel engine is started, particularly, when the Diesel engine is started at a low water temperature, it is preferable that a fuel injection quantity is defined according to a friction of an engine main body and a friction of an automatic transmission.

In this case, more concretely, the friction of the automatic transmission is stronger than that of the engine main body, and thus it is considered that the effect of the friction of the automatic transmission is great.

Further, the friction of the automatic transmission is generated mainly due to a load by an oil pump, and the friction has a characteristic such that it fluctuates and changes during cranking of the Diesel engine.

Therefore, when the Diesel engine is started, in the case where the fuel injection quantity is controlled by using a water temperature and engine speed and a fuel injection quantity map as in a conventional manner, an optimum fuel injection quantity can not be obtained occasionally.

When the fuel injection quantity is smaller than the optimum value, for example, the starting property of the Diesel engine is deteriorated and the starting time is increased so that a total fuel injection quantity at the time of starting is increased and white smoke of an exhaust gas is increased. On the contrary, when the fuel injection quantity is larger than the optimum value, the total fuel injection quantity at the time of starting is increased, and black smoke of the exhaust gas is increased. Such phenomena are remarkable particularly in the case where the viscosity of the fuel is low, a fuel leakage flow rate is increased, and thus the fuel injection quantity deviates from the optimum value.

The present invention has been achieved according to the above analysis of the present inventor, and its object is that the fuel injection quantity is optimized with respect to a friction of an automatic transmission at the time of starting the cranking of a Diesel engine and a change in a friction of the automatic transmission generated during the cranking.

Taking notice of a closely interrelation between the friction of an automatic transmission and a line pressure regarding the automatic transmission, an apparatus for controlling a fuel injection quantity at the time of starting a Diesel engine and a method for the same according to the present invention monitor the line pressure regarding the automatic transmission and correct a starting fuel injection quantity based on the line pressure.

Namely, an apparatus controlling a fuel injection quantity at the time of starting a Diesel engine according to the present invention, comprises: a water temperature sensor sensing a water temperature of the Diesel engine; an engine speed sensor sensing an engine speed of the Diesel engine; a starting fuel injection quantity set section setting a starting fuel injection quantity based on the water temperature at the time of starting the Diesel engine sensed by the water temperature sensor and the engine speed at the time of starting the Diesel engine sensed by the engine speed sensor; a line pressure sensor sensing a line pressure of an automatic transmission provided to the Diesel engine; and a starting fuel injection quantity correction section correcting the starting fuel injection quantity set by the starting fuel injection quantity set section based on the line pressure of the automatic transmission detected by the line pressure sensor.

In other words, an apparatus controlling a fuel injection quantity at the time of starting a Diesel engine according to the present invention, comprises: starting fuel injection quantity set means for setting a starting fuel injection quantity based on a water temperature at the time of starting the Diesel engine and an engine speed at the time of starting the Diesel engine; line pressure detection means for detecting a line pressure of an automatic transmission provided to the Diesel engine; and starting fuel injection quantity correction means for correcting the starting fuel injection quantity set by the starting fuel injection quantity set means based on the line pressure of the automatic transmission detected by the line pressure detection means.

In the meanwhile, a method for controlling a fuel injection quantity at the time of starting a Diesel engine according to the present invention detects a water temperature at the time of starting the Diesel engine; detects an engine speed at the time of starting the Diesel engine; sets a starting fuel injection quantity based on the water temperature at the time of starting the Diesel engine and the engine speed at the time of starting the Diesel engine; detects a line pressure of an automatic transmission provided to the Diesel engine; and corrects the starting fuel injection quantity based on the line pressure of the automatic transmission.

According to the above structure of the present invention, the starting fuel injection quantity of the Diesel engine can be optimized for the friction of the automatic transmission, and white smoke and black smoke can be reduced effectively and the fuel consumption can be reduced effectively.

DETAILED DESCRIPTION OF THE PREFERRED EMBODIMENTS

There will be detailed below each of embodiments of the present invention with reference to the drawings.

At first, the description will be given as to an apparatus for controlling a fuel injection quantity at the time of starting a Diesel engine and a method for the same according to a first embodiment of the present invention with reference to FIGS. 1 through 5.

Figure 1:
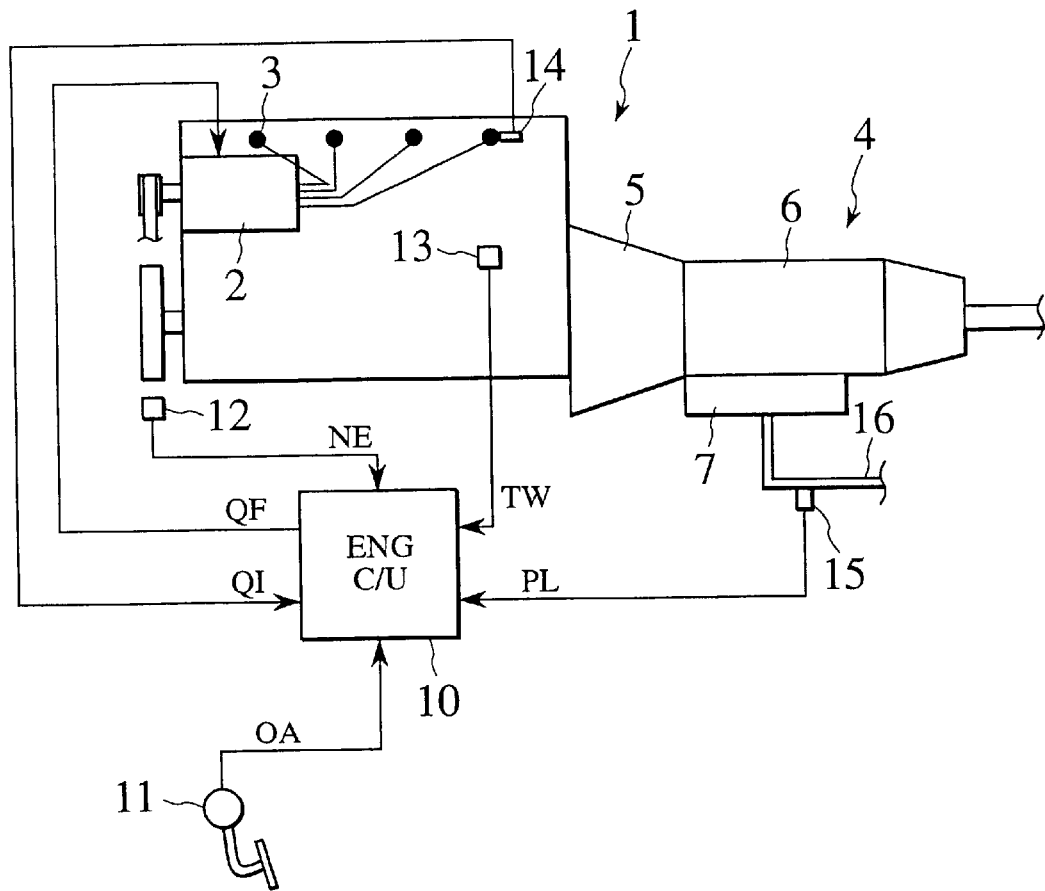
FIG. 1 shows a system diagram of a Diesel engine in which an apparatus for controlling a fuel injection quantity at the time of starting the Diesel engine and a method for the same according to a first embodiment of the present invention are applied.

In FIG. 1, a high pressure fuel is injected to be supplied from a distribution type electronic control fuel injection pump 2 to respective cylinders of a Diesel engine 1 by fuel injection nozzles 3 provided to the respective cylinders.

An automatic transmission 4 is provided to an output side of the Diesel engine 1. The automatic transmission 4 has a hydraulic torque converter 5 intervening on the output side of the engine 1, a gear type speed change mechanism 6 connected via the hydraulic torque converter 5, and a hydraulic actuator 7 for coupling and releasing various speed change elements in the gear type speed change mechanism 6.

In addition, an oil pump which is driven by the engine 1 is used for obtaining a line pressure which is a hydraulic oil pressure of the hydraulic torque converter 5 and the hydraulic actuator 7, but it is not shown here. Elements related to the oil pump are not shown as well.

Signals representing various information are inputted from various sensors to an engine control unit 10.

As such various sensors, an accelerator opening sensor 11 for detecting an opening OA of an accelerator pedal, a crank angle sensor 12 for detecting an engine speed NE of the engine 1, a water temperature sensor 13 for detecting a cooling water temperature TW of the engine 1, and a nozzle lift sensor 14 for detecting an actual fuel injection quantity QI which means an actual quantity of a fuel injection are provided.

Further, a line pressure sensor 15 for detecting a line pressure PL of the automatic transmission 4 is disposed to a piping 16 communicated with the oil pump, not shown, and its signal is inputted into the engine control unit 10.

Here, the engine control unit 10 calculates a fuel injection quantity QF based on the signals representing various information from the respective sensors so as to control the operation of the fuel injection pump 2.

In FIG. 1, the respective signals inputted from the respective sensors into the engine control unit 10 are represented by attaching symbols such as OA, NE or the like corresponding to the information obtained by the respective sensors. Moreover, the signal outputted from the engine control unit 10 into the fuel injection pump 2 is represented by a symbol QF corresponding to the fuel injection quantity which was calculated by the engine control unit 10.

Figure 2:
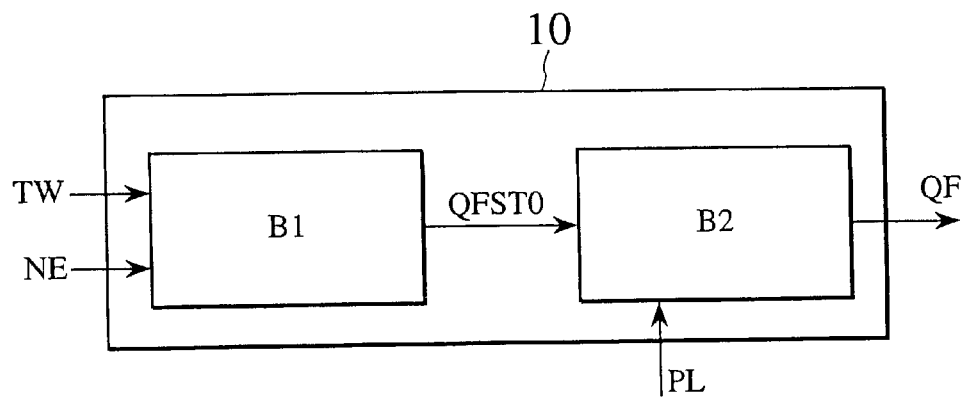
FIG. 2 shows a block diagram of an engine control unit according to the first embodiment.

More concretely as shown in FIG. 2, the engine control unit 10 has a starting fuel injection quantity set block B1 into which a cooling water temperature TW of the engine 1 and an engine speed NE of the engine 1 are inputted, and a starting fuel injection quantity correction block B2 into which a line pressure PL of the automatic transmission 4 is inputted and which corrects a starting fuel injection quantity reference value QFST0 set by the starting fuel injection quantity set block B1.

Figure 3:
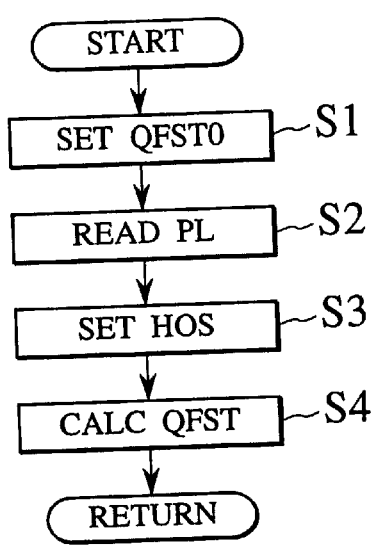
FIG. 3 is a flow chart showing a process executed by the engine control unit according to the first embodiment.

Moreover, the engine control unit 10 executes a process for controlling the fuel injection quantity as shown in FIG. 3 when the engine 1 is started. Such a process is executed for a desired time, for example, three minutes, at predetermined intervals, for example, per one rotation of the engine 1, from the time when an ignition key is turned on.

Figure 4:
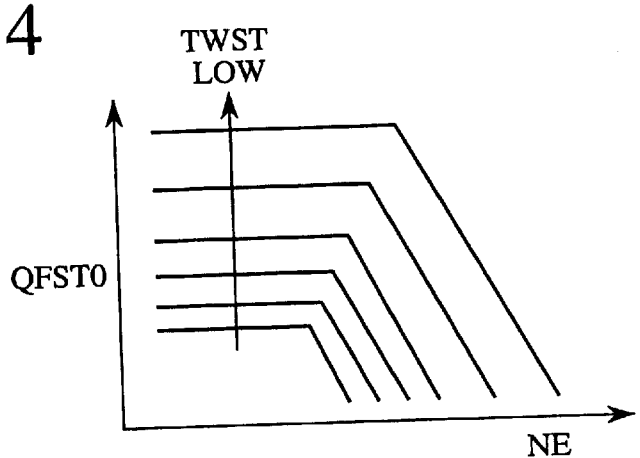
FIG. 4 shows a map for setting a starting fuel injection quantity reference value according to the first embodiment.

In FIG. 3, at step 1 (S1) a cooling water temperature TWST at the time of starting the engine 1 and an engine speed NE of the engine 1 are read, and a starting fuel injection quantity reference value QFST0 is set according to the starting cooling water temperature TWST and the engine speed NE by referring to a map previously set and shown in FIG. 4.

Here, the process at step 1 (S1) is executed by the starting fuel injection quantity set block B1.

More specifically, the map used at step 1 (S1) is stored in a memory, not shown, in the engine control unit 10. Also, as understood by referring to FIG. 4, the map has a following property, that is, as the cooling water temperature TWST at the time of starting the engine 1 becomes lower, the starting fuel injection quantity reference value QFST0 increases, and in the meanwhile, even if the cooling water temperature TWST is constant, when the engine speed NE of the engine 1 becomes larger beyond a predetermined value, the starting fuel injection quantity reference value QFST0 decreases from a constant value. Needless to say, the property of the map is not limited to this aspect, and it can be set in accordance with actual requirements by the engine 1 or the like.

And also, in order to set the starting fuel injection quantity reference value QFST0 at step 1 (S1), the cooling water temperature TWST at the time of starting the engine 1 and the engine speed NE of the engine 1, both of which are read in every time when the starting fuel injection quantity reference value QFST0 is set, are used.

Next, a line pressure PL is read in based on the signal from the line pressure sensor 15 at step 2 (S2).

Figure 5:
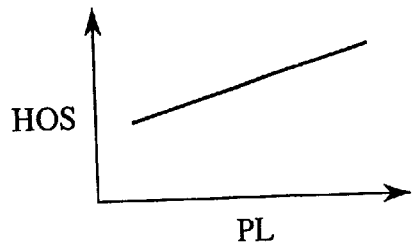
FIG. 5 shows a table for setting a correction coefficient according to the first embodiment.

Next, a correction coefficient HOS is set at step 3 (S3) from the actual line pressure PL by referring to a table shown in FIG. 5 where the correction coefficient HOS is previously set according to the line pressure PL.

Here, in order to be understandable by referring to FIG. 5, a property such that as the line pressure PL increases, the correction coefficient HOS increases linearly is given to the table used at step 3 (S3), and the table is stored in the memory, not shown, in the engine control unit 10.

At last, a final starting fuel injection quantity QFST is calculated at step 4 (S4) by multiplying the starting fuel injection quantity reference value QFST0 by the correction coefficient HOS, that is, QFST=QFST0×HOS.

In such a manner, in the present embodiment, as the line pressure PL is higher, the starting fuel injection quantity QFST is corrected to be increased and is optimized for a friction of the automatic transmission 4. Here, the processes at steps 2 (S2) through 4 (S4) are executed by the starting fuel injection quantity correction block B2.

According to the present embodiment, the starting fuel injection quantity at the time of starting the Diesel engine 1 can be optimized for the friction of the automatic transmission, and therefore, white smoke and black smoke can be reduced effectively and the fuel consumption can be reduced effectively.

There will be described below an apparatus for controlling a fuel injection quantity at the time of starting the Diesel engine and a method for the same according to a second embodiment of the present invention with reference to FIGS. 6 through 8.

Figure 6:
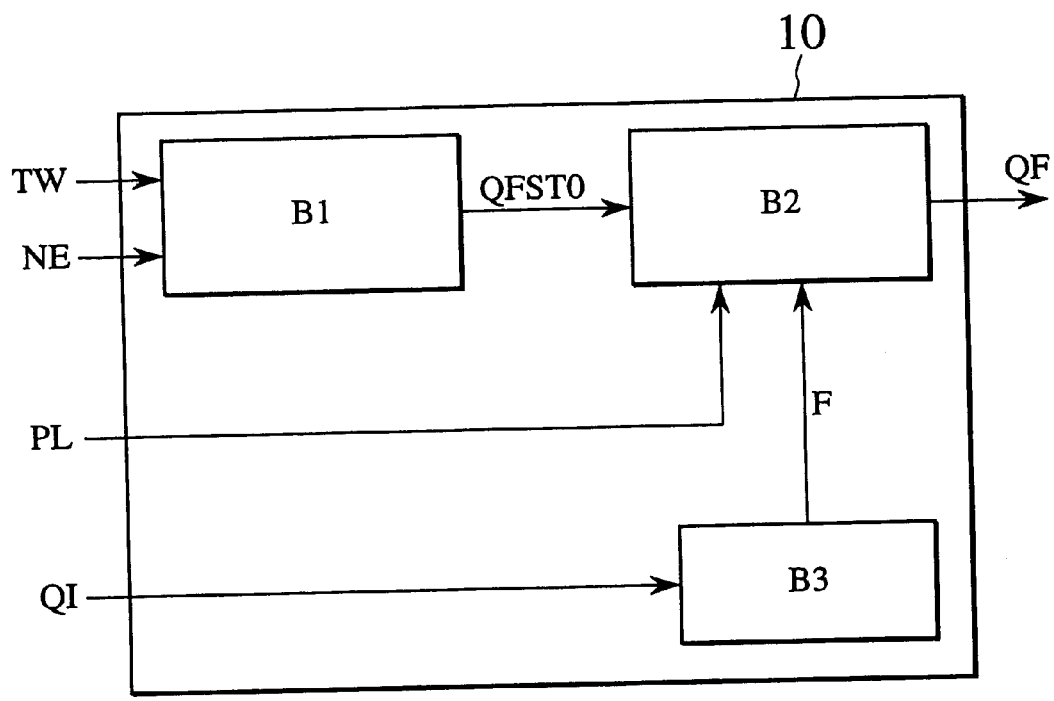
FIG. 6 shows a block diagram of an engine control unit according to a second embodiment of the present invention.

As shown in FIG. 6, the engine control unit 10 of the present embodiment has the starting fuel injection quantity set block B1 into which the cooling water temperature TW of the engine 1 and the engine speed NE of the engine 1 are inputted, the starting fuel injection quantity correction block B2 into which the line pressure PL of the automatic transmission 4 is inputted and which corrects the starting fuel injection quantity reference value QFST0 set by the starting fuel injection quantity set block B1. and also a correction quantity variable block B3 which discriminates a fuel property from an inputted actual fuel injection quantity QI and transmits fuel property information F to the starting fuel injection quantity correction block B2 so as to vary its correction quantity HOS used in the starting fuel injection quantity correction block B2.

That is, the present embodiment is different from the first embodiment in that the correction quantity variable block B3 is further provided, and the other parts of constitution are essentially the same.

Figure 7:
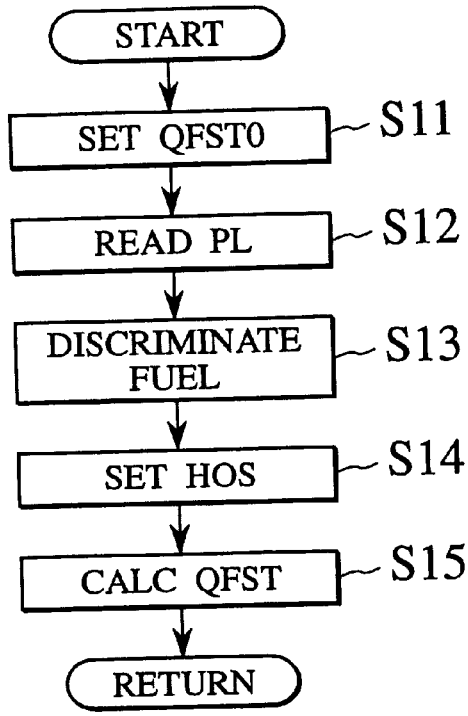
FIG. 7 is a flow chart showing a process executed by the engine control unit according to the second embodiment.

Thus, the engine control unit 10 executes a process for controlling a fuel injection quantity shown in FIG. 7 when the engine 1 is started similarly to the first embodiment.

In FIG. 7, similarly to the first embodiment, the starting fuel injection quantity reference value QFST0 is set at step 11 (S11).

Next, similarly to the first embodiment, the line pressure PL is read at step 12 (S12).

Next, the fuel property, more concretely, its viscosity is discriminated at step 13 (S13). More concretely, at step 13 (Sl3), in the case where the viscosity of the fuel is low, a leakage flow rate of the fuel becomes high, and thus the actual fuel injection quantity QI is reduced with respect to the instructed fuel injection quantity. Therefore, a discrimination is made as to whether two types of the viscosity, namely, high viscosity (for example, JIS No. 2 light oil) and low viscosity (for example, JIS special No. 3 light oil) based on the signal of the nozzle lift sensor 14 representing the actual fuel injection quantity QI and transmits the fuel property information F to the starting fuel injection quantity correction block B2. This process is executed by the correction quantity variable block B3.

Figure 8:
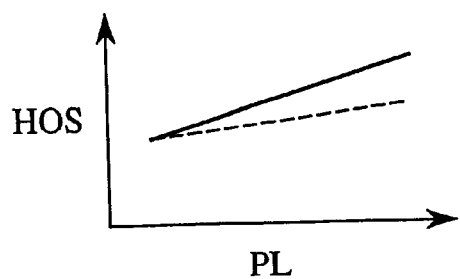
FIG. 8 shows a table for setting a correction coefficient according to the second embodiment.

Next, at step 14 (S14), a table as shown in FIG. 8 where the correction coefficient HOS is previously determined according to the line pressure PL per the fuel property is referred to, so that the correction coefficient HOS is set according to the fuel property in the fuel property information F. Here, in the table, when the viscosity is low, the correction coefficient HOS is set so that an increase rate of the fuel injection quantity becomes large based on a characteristic indicated by a solid line in FIG. 8, and when the viscosity is high, the correction coefficient HOS is set so that the increase rate of the fuel injection quantity becomes small based on a characteristic of a dotted line in FIG. 8. The table is stored in the memory, not shown, in the engine control unit 10.

Next, similarly to the first embodiment, at step 15 (S15), the starting fuel injection quantity reference value QFST0 is multiplied by the correction coefficient HOS so that the final starting fuel injection quantity QFST is calculated, that is, QFST=QFST0×HOS.

Here, the process at step 11 (S11) is executed by the starting fuel injection quantity set block B1, and the processes at steps 12 (S12), step 14 (S14) and step 15 (S15) are executed by the starting fuel injection quantity correction block B2, and the process at step 13 (S13) is executed by the correction quantity variable block B3.

According to the present embodiment, the fuel property is discriminated and the correction quantity of the starting fuel injection quantity is varied according to the fuel property, more concretely, when the viscosity of the fuel is high, the increase correction quantity is set to be small, and when the viscosity of the fuel is low, the increase correction quantity is set to be large so that the optimized correction quantity is used. Therefore, by taking into account the fuel property, the fuel injection quantity at the time of starting the Diesel engine 1 can be optimized further than the first embodiment, and thus white smoke and black smoke can be reduced effectively and the fuel consumption can be reduced effectively.

There will be described below an apparatus for controlling a fuel injection quantity at the time of starting the Diesel engine and a method for the same according to a third embodiment of the present invention with reference to FIGS. 9 and 10.

Figure 9:
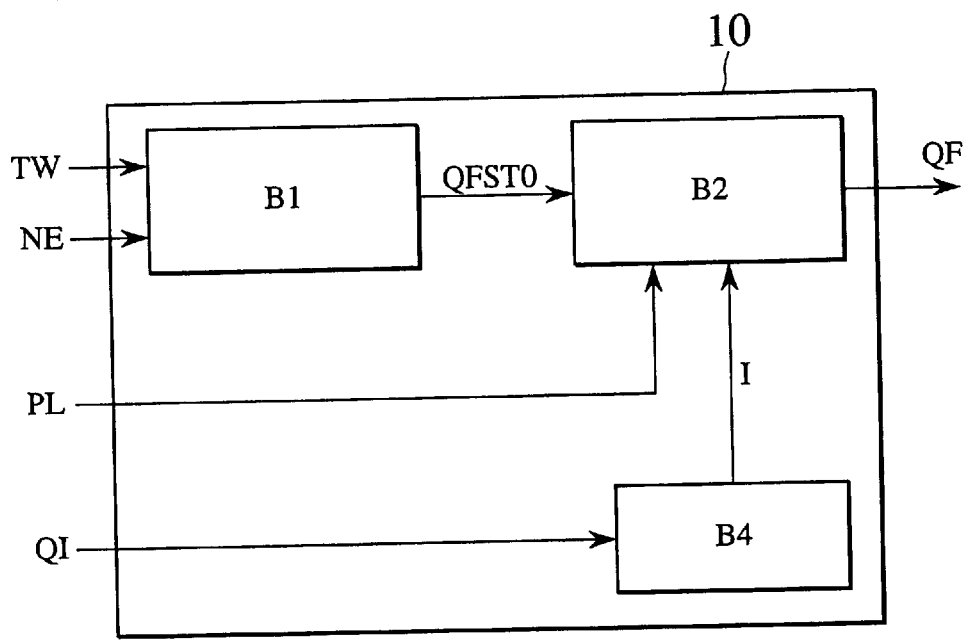
FIG. 9 shows a block diagram of a engine control unit according to a third embodiment of the present invention.

As shown in FIG. 9, the engine control unit 10 according to the present embodiment has the starting fuel injection quantity set block B1 into which the cooling water temperature TW of the engine 1 and the engine speed NE of the engine 1 are inputted, the starting fuel injection quantity correction block B2 into which the line pressure PL of the automatic transmission 4 is inputted and which corrects the starting fuel injection quantity reference value QFST0 set by the starting fuel injection quantity set block B1, and also a correction prohibition block B4 into which the actual fuel injection quantity QI is inputted and which discriminates the fuel property from the inputted actual fuel injection quantity QI and transmits correction prohibition information I according to the discriminated fuel property to the starting fuel injection quantity correction block B2 and prohibits the correction if applicable.

That is, the present embodiment is different from the first embodiment in that the correction prohibition block B4 is provided, and the other parts of the structure are essentially the same. Moreover, instead of the correction quantity variable block B3 of the second embodiment, the correction prohibition block B4 is provided.

Figure 10:
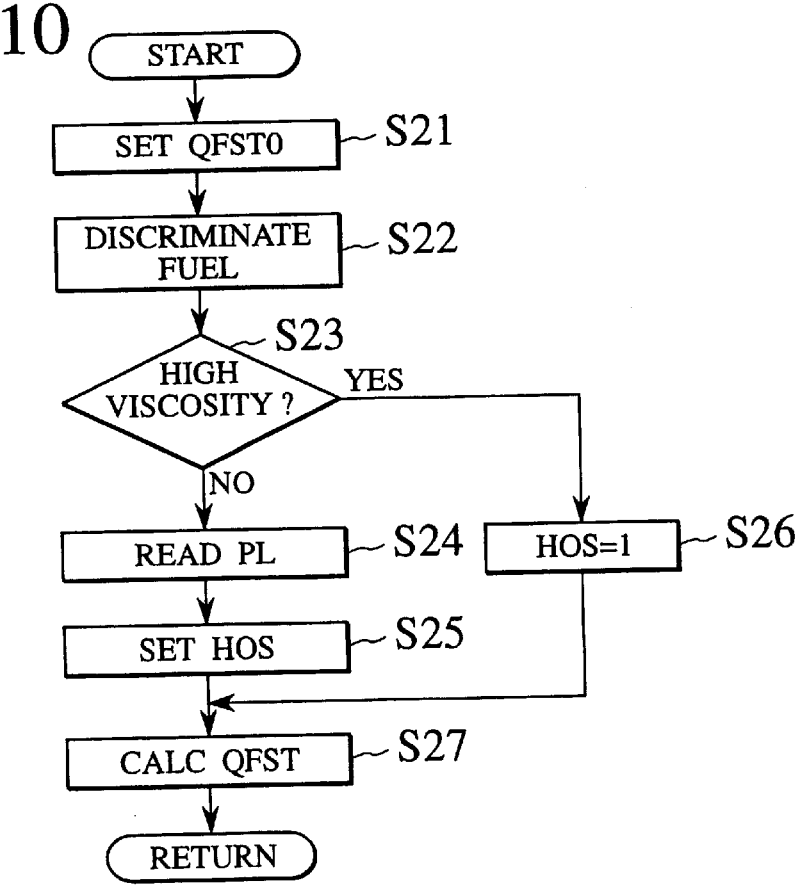
FIG. 10 is a flow chart showing a process executed by the engine control unit according to the third embodiment.

The engine control unit 10 executes a process for controlling a fuel injection quantity shown in FIG. 10 when the engine 1 is started similarly to the first embodiment.

At first, in FIG. 10, similarly to the first embodiment, the starting fuel injection quantity set block B1 sets the starting fuel injection quantity reference value QFST0 at step 21 (S21).

Next, at step 22 (S22), the correction prohibition block B4 discriminates the fuel property, more concretely the viscosity of the fuel in a similar manner in the correction quantity variable block B3 at step 13 (S13) in the second embodiment.

Next, at step 23 (S23), in the case where the viscosity of the fuel discriminated at step 22 (S22) by the correction prohibition block B4 is low, the correction prohibition block B4 transmits correction instruction information I regarding an instruction in order to correct the starting fuel injection quantity reference value QFST0, more specifically information representing the correction, to the starting fuel injection quantity correction block B2, and the process goes to step 24 (S24) and step 25 (S25). On the contrary, in the case where the viscosity of the fuel discriminated at step 22 (S22) by the correction prohibition block B4 is high, the correction prohibition block B4 transmits the correction instruction information I regarding an instruction to correct the starting fuel injection quantity reference value QFST0, more specifically information representing an instruction in order to prohibit the correction, to the starting fuel injection quantity correction block B2, and the process goes to step 26 (S26). This is because in the case where viscosity of the fuel is high, since the leakage flow rate is low, the increase quantity correction is not required.

At step 24 (S24) and step 25 (S25), the starting fuel injection quantity correction block B2 executes a process in the case where the viscosity of the fuel is low, namely, corrects the starting fuel injection quantity reference value QFST0. More concretely, the starting fuel injection quantity correction block B2 reads the line pressure PL at step 24 (S24) similarly to the first embodiment, and refers to a table similarly to the first embodiment so as to set the correction coefficient HOS according to the line pressure PL at step 25 (S25).

On the contrary, at step 26 (S26), the starting fuel injection quantity correction block B2 executes a process in the case where the viscosity of the fuel is high, namely, does execute a process so as not to execute the correction according to the prohibition from the correction of the starting fuel injection quantity reference value QFST0 by the correction prohibition block B4. More concretely, it sets the correction coefficient HOS to 1.

Then, the process proceeds from steps 25 (S25) and 26 (S26) to step 27 (S27) so that the starting fuel injection quantity correction block B2 obtains a final starting fuel injection quantity reference value QFST similarly to the first embodiment. Here, the starting fuel injection quantity QFST is obtained according to QFST=QFST0×HOS, but in the case where the process proceeds from step 26 (S26) to step (S27), since HOS=1, the starting fuel injection quantity reference value QFST0 is not corrected so as to directly become the final starting fuel injection quantity reference value QFST.

According to the present embodiment, the fuel property is discriminated and the correction of the starting fuel injection quantity is prohibited according to the fuel property, more concretely, when the viscosity of the fuel is high, the increase quantity correction is prohibited, and when the viscosity of the fuel is low, the increase quantity correction is executed. Therefore, the necessity of the correction is discriminated by taking into account the fuel property, and in the case where the necessity of the correction is low, the correction is omitted and in the case where the necessity of the correction is high, the correction is executed securely. As a result, the fuel injection quantity at the time of starting the Diesel engine 1 can be optimized more efficiently than the first embodiment, and thus white smoke and black smoke can be reduced effectively and the fuel consumption can be reduced effectively.

There will be described below an apparatus for controlling a fuel injection quantity at the time of starting the Diesel engine and a method for the same according to a fourth embodiment of the present invention with reference to FIGS. 11 and 12.

Figure 11:
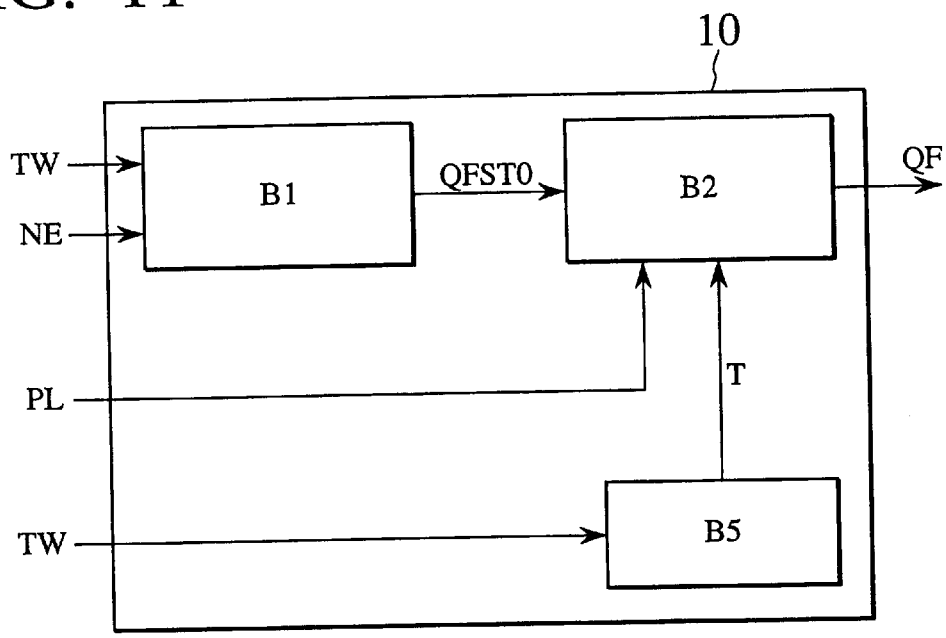
FIG. 11 shows a block diagram of the engine control unit according to a fourth embodiment of the present invention.

As shown in FIG. 11, the engine control unit 10 of the present embodiment has the starting fuel injection quantity set block B1 into which the cooling water temperature TW of the engine 1 and the engine speed NE of the engine 1 are inputted, the starting fuel injection quantity correction block B2 into which the line pressure PL of the automatic transmission 4 is inputted and which corrects the starting fuel injection quantity reference value QFST0 set by the starting fuel injection quantity set block B1, and a correction quantity variable block B5 into which the cooling water temperature TW of the engine 1 is inputted and which transmits temperature information T representing that the cooling water temperature TW is high or low to the starting fuel injection quantity correction block B2 so as to vary the correction quantity HOS.

Therefore, the present embodiment is different from the first embodiment in that the correction quantity variable block B5 is provided, and the other elements of the structure are essentially the same. Moreover, the correction quantity variable block B5 is different from the correction quantity variable block B3 of the second embodiment in that it varies the correction quantity HOS according to high or low of the cooling water temperature TW.

Figure 12:
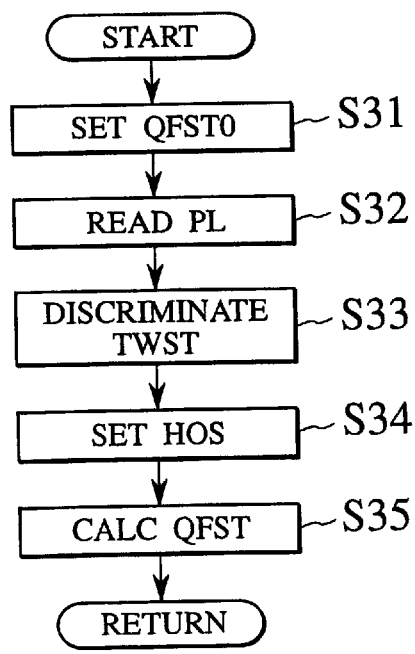
FIG. 12 is a flow chart showing the a process executed by the engine control unit according to the fourth embodiment.

The engine control unit 10 executes a process for controlling a fuel injection quantity shown in FIG. 12 when the engine 1 is started similarly to the first embodiment.

At first, in FIG. 12, similarly to the first embodiment, the starting fuel injection quantity reference value QFST0 is set at step 31 (S31).

Next, similarly to the first embodiment, the line pressure PL is read at step 32 (S32).

Next, a discrimination is made at step 33 (S33) as to whether the cooling water temperature TWST at the time of starting the engine 1 is high or low, since the friction of the automatic transmission 4 is small when the cooling water temperature TWST at the time of starting the engine 1 is high. The cooling water temperature is discriminated based on a signal from the water temperature sensor 13 representing the cooling water temperature TW of the engine 1. In the case where the cooling water temperature TWST at the time of starting the engine 1 is high, for example, at the time of hot-restarting, that is, when the cooling water temperature TW is not less than 90° C., for example, it is discriminated as a high temperature, and when less than 90° C., discriminated as a low temperature. Then temperature discrimination information T is transmitted to the starting fuel injection quantity correction block B2. This process is executed by the correction quantity variable block B5.

Here, in order to execute the discrimination at step 33 (S33) as to whether the cooling water temperature is high or low, the cooling water temperature TWST at the time of starting the engine 1, which is read in every time when such a discrimination at step 33 (S33) is executed, is used.

Next at step 34 (S34), a table where the correction coefficient HOS is previously determined according to the line pressure PL per the cooling water temperature TWST at the time of starting the engine 1 is referred to, so that the correction coefficient HOS is set according to high or low temperature in the temperature information T. More specifically, the table used at step 34 (S34) is similar to that shown in FIG. 8, and in the case where the starting cooling water temperature TWST is low, the correction coefficient HOS is set so that the increase quantity rate becomes large based on a characteristic represented by a solid line in FIG. 8. On the contrary, in the case where the starting cooling water temperature TWST is high, the correction coefficient HOS is set so that the increase quantity rate becomes small based on a characteristic represented by a dotted line in FIG. 8.

At last, similarly to the first embodiment, at step 35 (S35), the starting fuel injection quantity reference value QFST0 is multiplied by the correction coefficient HOS so that the final starting fuel injection quantity QFST is calculated, that is, QFST=QFST0×HOS.

Here, the process at step S31 (S31) is executed by the starting fuel injection quantity set block B1, and the processes at steps 32 (S32), 34 (S34) and 35 (S35) are executed by the starting fuel injection quantity correction block B2, and the process at step 33 (S33) is executed by the correction quantity variable block B5.

According to the present embodiment, the discrimination is made as to whether the cooling water temperature of the engine is high or low, and the correction quantity of the starting fuel injection quantity is varied according to the cooling water temperature, more concretely, when the cooling water temperature is high, the increase correction quantity is set to be small, and when the cooling water temperature is low, the increase correction quantity is set to be large so that the optimized correction quantity is used. Therefore, the cooling water temperature of the engine is taken into account so that the fuel injection quantity at the time of starting the Diesel engine 1 can be optimized more efficiently than the first embodiment, and thus white smoke and black smoke can be reduced effectively and the fuel consumption can be reduced effectively.

Finally, there will be described below an apparatus for controlling a fuel injection quantity at the time of starting the Diesel engine and a method for the same according to a fifth embodiment of the present invention with reference to FIGS. 13 and 14.

Figure 13:
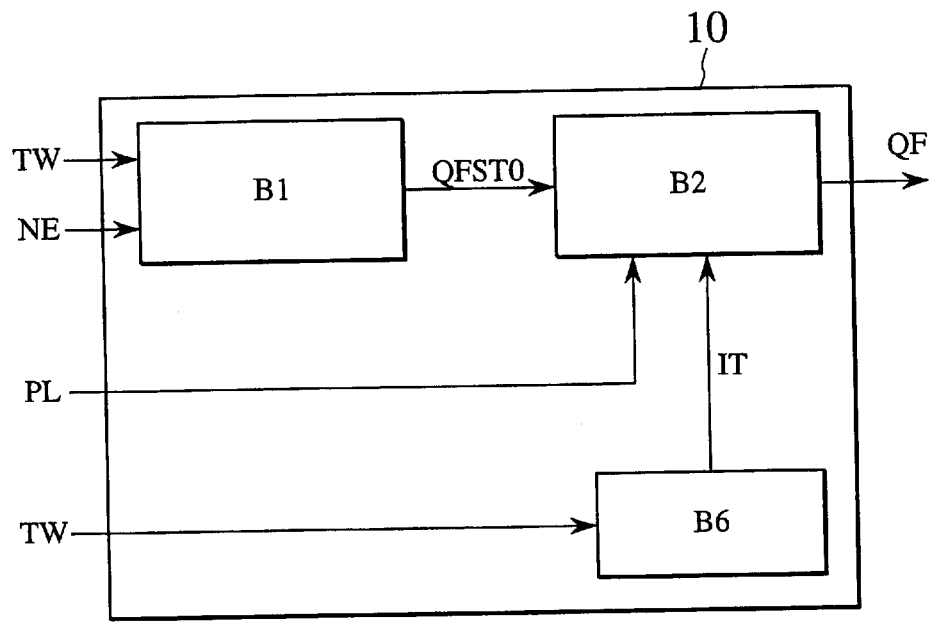
FIG. 13 shows a block diagram of a engine control unit according to a fifth embodiment of the present invention.

As shown in FIG. 13, the engine control unit 10 of the present embodiment has the starting fuel injection quantity set block B1 into which the cooling water temperature TW of the engine 1 and the engine speed NE of the engine 1 are inputted, the starting fuel injection quantity correction block B2 into which the line pressure PL of the automatic transmission 4 is inputted and which corrects the starting fuel injection quantity reference value QFST0 set by the starting fuel injection quantity set block B1, and a correction prohibition block B6 into which the cooling water temperature TW of the engine 1 is inputted and which discriminates as to whether the cooling water temperature TW is high or low and transmits correction prohibition information IT corresponding to the discriminated high or low cooling water temperature TW to the starting fuel injection quantity correction block B2 so as to prohibit the correction if applicable.

Therefore, the present embodiment is different from the first embodiment in that the correction prohibition block B6 is provided, and the other elements of the structure are essentially the same. Moreover, the correction prohibition block B6 is different from the correction prohibition block B4 of the third embodiment in that it prohibits the correction according to the high or low cooling water temperature TW.

Figure 14:
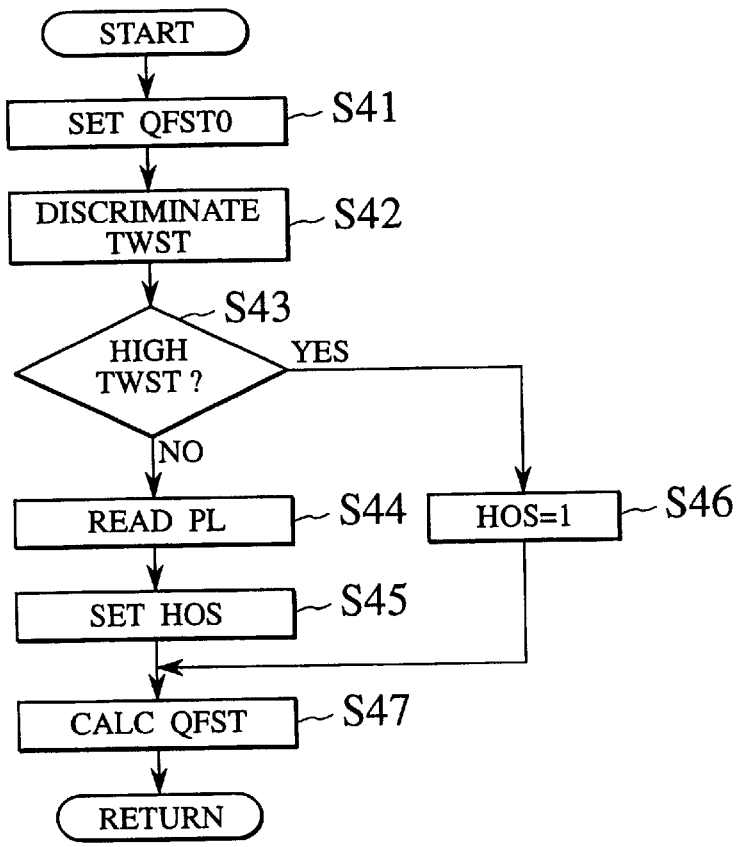
FIG. 14 is a flow chart showing a process executed by the engine control unit according to the fifth embodiment.

The engine control unit 10 executes a process shown in FIG. 14 for controlling a fuel injection quantity when the engine 1 is started similarly to the first embodiment.

At first, in FIG. 14, at step 41 (S41), the starting fuel injection quantity set block B1 sets the starting fuel injection quantity reference value QFST0 similarly to the first embodiment.

Next, at step 42 (S42), the correction prohibition block B6 discriminates as to whether the cooling water temperature TWST at the time of starting the engine 1 is high or low in the similar manner to the process at step 33 (S33) executed by the correction quantity variable block B5 in the fourth embodiment.

Here, in order to execute the discrimination at step 42 (S42) as to whether the cooling water temperature is high or low, the cooling water temperature TWST at the time of starting the engine 1, which is read in every time when such a discrimination at step 42 (S42) is executed, is used.

Next, at step 43 (S43), in the case where the cooling water temperature TWST at the time of starting the engine 1 discriminated by the correction prohibition block B6 is low, the correction prohibition block B6 transmits the correction instruction information IT regarding an instruction to correct the starting fuel injection quantity reference value QFST0, more specifically, information representing an instruction of the correction, to the starting fuel injection quantity correction block B2, and the process proceeds to steps 44 (S44) and 45 (S45). In the meanwhile, in the case where the cooling temperature TWST at the time of starting the engine 1 discriminated at step 42 (S42) by the correction prohibition block B6 is high, the correction prohibition block B6 transmits the correction instruction information IT regarding correction of the starting fuel injection quantity reference value QFST0, more concretely the information representing the instruction to prohibit the correction, to the starting fuel injection quantity correction block B2, and the process proceeds to step 46 (S46). This is because in the case where the cooling water temperature is high, since the friction of the automatic transmission 4 is small, the increase quantity correction is not required.

At steps 44 (S44) and 45 (S45), the starting fuel injection quantity correction block B2 executes a process in the case where the cooling water temperature TWST at the time of starting the engine 1 is low, namely, corrects the starting fuel injection quantity reference value QFST0. More concretely, the line pressure PL is read at step 44 (S44) similarly to the first embodiment, and the table is referred to so that the correction coefficient HOS is set according to the line pressure PL at step 45 (S45) similarly to the first embodiment.

On the contrary, at step 46 (S46), the starting fuel injection quantity correction block B2 executes the process in the case where the cooling water temperature TWST at the time of starting the engine 1, namely, does not execute the correction according to the prohibition from the correction of the starting fuel injection quantity reference value QFST0. More concretely, the correction coefficient HOS is set to 1.

Then, the process goes from steps 45 (S45) and 46 (S46) to step 47 (S47) so that the starting fuel injection quantity correction block B2 obtains the final starting fuel injection quantity reference value QFST similarly to the first embodiment. Here, the starting fuel injection quantity QFST is obtained according to QFST=QFST0×HOS, but in the case where the process goes from step 46 (S46) to step 47 (S47), since HOS=1, the starting fuel injection quantity reference value QFST0 is not corrected so as to directly become the final starting fuel injection quantity reference value QFST.

According to the present embodiment, the discrimination is made as to whether the cooling water temperature of the engine is high or low and the correction of the starting fuel injection quantity is prohibited according to the high or low cooling water temperature, more concretely, when the cooling water temperature is high, the increase quantity correction is prohibited, and when the cooling water temperature is low, the increase quantity is corrected. Therefore, the necessity of the correction is discriminated by taking into account the high or low cooling water temperature of the engine, and when the necessity of the correction is low, the correction is omitted. When the necessity of the correction is high, the correction is executed securely so that the fuel injection quantity at the time of starting the Diesel engine 1 is optimized more efficiently than the first embodiment, and white smoke and black smoke can be reduced effectively and the fuel consumption can be reduced effectively.

The entire contents of a Patent Application No. TOKUGANHEI 10-190447, with a filing date of Jul. 6, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An apparatus controlling a fuel injection quantity at the time of starting a Diesel engine, comprising:
    a water temperature sensor sensing a water temperature of said Diesel engine;
    an engine speed sensor sensing an engine speed of said Diesel engine;
    a starting fuel injection quantity set section setting a starting fuel injection quantity based on said water temperature at the time of starting said Diesel engine sensed by said water temperature sensor and said engine speed at the time of starting said Diesel engine sensed by said engine speed sensor;
    a line pressure sensor sensing a line pressure of an automatic transmission provided to said Diesel engine; and
    a starting fuel injection quantity correction section correcting said starting fuel injection quantity set by said starting fuel injection quantity set section based on said line pressure of said automatic transmission detected by said line pressure sensor.

2. An apparatus controlling a fuel injection quantity at the time of starting a Diesel engine according to claim 1, further comprising a correction quantity variable section discriminating a fuel property of a fuel used in said Diesel engine and, based on said fuel property, varying a correction quantity used in said starting fuel injection quantity correction section in order to correct said starting fuel injection quantity.

3. An apparatus controlling a fuel injection quantity at the time of starting a Diesel engine according to claim 2, wherein in the case where a viscosity of said fuel discriminated by said fuel correction quantity variable section is high, said fuel correction quantity variable section makes said correction quantity, used in said starting fuel injection quantity correction section so as to increase said starting fuel injection quantity, varied to be small.

4. An apparatus controlling a fuel injection quantity at the time of starting a Diesel engine according to claim 1, further comprising a correction quantity prohibition section discriminating a fuel property of a fuel used in the Diesel engine and, in the case where a viscosity of said fuel is high, prohibiting said starting fuel injection quantity correction section from correcting said starting fuel injection quantity.

5. An apparatus controlling a fuel injection quantity at the time of starting a Diesel engine according to claim 1, further comprising a correction quantity variable section varying a correction quantity, used in said starting fuel injection quantity correction section in order to correct said starting fuel injection quantity, based on said water temperature at the time of starting said Diesel engine sensed by said water temperature sensor.

6. An apparatus controlling a fuel injection quantity at the time of starting a Diesel engine according to claim 5, wherein in the case where said water temperature at the time of starting said Diesel engine sensed by said water temperature sensor is high, said fuel correction quantity variable section makes said correction quantity, used in said starting fuel injection quantity correction section so as to increase said starting fuel injection quantity, varied to be small.

7. An apparatus controlling a fuel injection quantity at the time of starting a Diesel engine according to claim 1, further comprising a correction quantity prohibition section prohibiting said starting fuel injection quantity correction section from correcting said starting fuel injection quantity in the case where said water temperature at the time of starting said Diesel engine sensed by said water temperature sensor is high.

8. An apparatus controlling a fuel injection quantity at the time of starting a Diesel engine, comprising:
    starting fuel injection quantity set means for setting a starting fuel injection quantity based on a water temperature at the time of starting said Diesel engine and an engine speed at the time of starting said Diesel engine;
    line pressure detection means detecting a line pressure of an automatic transmission provided to said Diesel engine; and
    starting fuel injection quantity correction means correcting said starting fuel injection quantity set by said starting fuel injection quantity set means based on said line pressure of said automatic transmission detected by said line pressure detection means.

9. A method of controlling a fuel injection quantity at the time of starting a Diesel engine, comprising:
    detecting a water temperature at the time of starting said Diesel engine;
    detecting an engine speed at the time of starting said Diesel engine;
    setting a starting fuel injection quantity based on said water temperature at the time of starting said Diesel engine and said engine speed at the time of starting said Diesel engine;
    detecting a line pressure of an automatic transmission provided to said Diesel engine; and
    correcting said starting fuel injection quantity based on said line pressure of said automatic transmission.

* * * * *